US010002399B2

(12) United States Patent
Torgersud et al.

(10) Patent No.: US 10,002,399 B2
(45) Date of Patent: Jun. 19, 2018

(54) PREFERENTIAL PRICING, SYSTEM AND METHOD

(71) Applicant: Intelmate LLC, San Francisco, CA (US)

(72) Inventors: Richard Torgersud, San Francisco, CA (US); Christopher Ditto, San Jose, CA (US); Nancy K. Lee, Coppell, TX (US)

(73) Assignee: Intelmate LLC, San Francisco, CA (US)

(*) Notice: Subject to any disclaimer, the term of this patent is extended or adjusted under 35 U.S.C. 154(b) by 560 days.

(21) Appl. No.: 13/957,204

(22) Filed: Aug. 1, 2013

(65) Prior Publication Data

US 2015/0039411 A1    Feb. 5, 2015

(51) Int. Cl.
*G06Q 30/00* (2012.01)
*G06Q 50/32* (2012.01)
*G06Q 30/02* (2012.01)

(52) U.S. Cl.
CPC ......... *G06Q 50/32* (2013.01); *G06Q 30/0225* (2013.01); *G06Q 30/0226* (2013.01); *G06Q 30/0236* (2013.01); *G06Q 30/0207* (2013.01); *G06Q 30/0224* (2013.01)

(58) Field of Classification Search
CPC ........... G06Q 30/0207; G06Q 30/0224; G06Q 30/0236; G06Q 30/0237; G06Q 50/02; H04M 15/00; H04M 1/663
USPC ...... 705/14.1, 14.25, 14.36, 14.37; 379/114.1, 114.12, 114.14, 121.02, 379/142.05
See application file for complete search history.

(56) References Cited

U.S. PATENT DOCUMENTS

| | | | | |
|---|---|---|---|---|
| 6,032,136 A * | 2/2000 | Brake, Jr. | ............... | G06Q 20/10 235/380 |
| 6,636,591 B1 * | 10/2003 | Swope | ................. | H04M 15/00 379/114.01 |
| 6,804,337 B1 * | 10/2004 | Anderson | ............ | H04M 15/00 379/114.01 |
| 6,912,399 B2 * | 6/2005 | Zirul | ..................... | H04M 1/663 379/201.01 |
| 7,162,475 B2 * | 1/2007 | Ackerman | .............. | G06F 21/32 |
| 7,278,026 B2 * | 10/2007 | McGowan | ........... | G06Q 20/341 283/17 |
| 7,460,653 B2 * | 12/2008 | Brahm | ............... | G06Q 20/3674 379/142.05 |
| 7,698,182 B2 * | 4/2010 | Falcone | ................. | G06Q 40/00 379/114.01 |

(Continued)

OTHER PUBLICATIONS

Van, MCI Plan Enlists Family, Friends, (Chicago Tribute, Mar. 19, 1991).*

(Continued)

*Primary Examiner* — Bennett M Sigmond
(74) *Attorney, Agent, or Firm* — FBFK PC

(57) ABSTRACT

An exemplary embodiment provides for a computer-implemented method for self-selection into a familial-based discount telephonic rate program. The method includes receiving an indication that a person is related to a current participant of the familial-based discount telephonic rate program and adding a person to the familial-based discount telephonic rate program as a relative to a current participant. The computer-implemented method further includes providing discounted telephone call rates for phone calls between the person and the current participant.

27 Claims, 10 Drawing Sheets

(56) References Cited

U.S. PATENT DOCUMENTS

| | | | | |
|---|---|---|---|---|
| 7,783,729 B1* | 8/2010 | Macaluso | G06F 8/63 | 455/414.2 |
| 7,860,226 B1* | 12/2010 | Falcone | G06Q 30/04 | 379/114.2 |
| 8,098,804 B1* | 1/2012 | Rae | H04M 3/38 | 370/278 |
| 8,225,395 B2* | 7/2012 | Atwood | G06Q 10/10 | 726/22 |
| 8,406,813 B2* | 3/2013 | Kirbas | H04M 1/677 | 455/406 |
| 2003/0002639 A1* | 1/2003 | Huie | G06Q 30/04 | 379/114.27 |
| 2008/0033816 A1* | 2/2008 | Miller | G06Q 30/02 | 705/14.18 |
| 2008/0300893 A1* | 12/2008 | Mendoza | G06Q 10/10 | 705/1.1 |
| 2013/0085838 A1* | 4/2013 | Tennenholtz | G06Q 10/04 | 705/14.41 |
| 2013/0091581 A1* | 4/2013 | Pirani | G06F 21/31 | 726/26 |
| 2013/0311283 A1* | 11/2013 | Liu | G06F 17/30539 | 705/14.53 |

OTHER PUBLICATIONS

Focus on the Family, Canada, Clergy Appreciation Guide, published at http://www.focusonthefamily.ca/pastorappreciation/PastorAppreciation.pdf, as published Jul. 2, 2011 and available at https://web.archive.org/web/20110702103848/http://focusonthefamily.ca/pastorappreciation/PastorAppreciation.pdf.*

MacDonald, Rogers Lauches Improved Unlimited Family and Student Plan (RogersMiranda, Aug. 5, 2010, available at http://redboard.rogers.com/2010/08/05/).*

Hodkins, Verizon Wireless to offer new "Friends & Family" feature (BGR, Feb. 12, 2009 at http://bgr.com/news).*

* cited by examiner

PREFERENTIAL PRICING, SYSTEM AND METHOD

BACKGROUND

Controlled facilities, such as a jail, prison, secure detention environments, detention facility, secured hospital, or addiction treatment facility, house large populations of individuals in confinement, which presents unique administrative challenges. In such detention environments, detained individuals, such as prisoners, offenders, convicts, military personnel, patients, government cleared personnel, or other detainees, frequently desire to communicate with individuals outside the detention environment such as friends or family members.

Detainee contact with the outside world is further desirous as such contact often can lead to improved detainee behavior and can also contribute to a lower recidivism rate, once detainees are released to the outside world.

However, controlled facility officials also have valid security concerns regarding detainee communications. The cost to address these concerns may sometimes at least partially be passed on to the detainee and the people that communicate with him.

Due to these conflicting goals (providing communication services for detainees to the outside world but certain security-related communication costs could potentially discourage communication), in addition to a lack of pre-existing, viable alternatives, there is a need for options that satisfies the needs of all the involved parties.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The claimed embodiments provide for a computer-implemented method for self-selection into a familial-based discount telephonic rate program. The method includes receiving an indication that a person is related to a current participant of the familial-based discount telephonic rate program and adding a person to the familial-based discount telephonic rate program as a relative to a current participant. The computer-implemented method further includes providing discounted telephone call rates for phone calls between the person and the current participant.

In another implementation, the claimed embodiments also provide another computer-implemented method for self-selection into a familial-based discount telephonic rate program that initially provides an application for participation in the familial-based discount telephonic rate program. Once provided, the method may then receive a completed application for participation in a familial-based discount telephonic rate program and also determine eligibility for the familial-based telephonic discount rate program based on the completed application.

In yet another implementation, the claimed embodiments provide for a computer-implemented method for self-selection into a pre-defined relationship-based discount telephonic rate program. The method includes receiving an indication that a person has an existing association with a current participant of the pre-defined relationship-based discount telephonic rate program and also adding the person to the pre-defined relationship-based discount telephonic rate program as being associated with the current participant. In turn, the computer-implemented method then provides discounted telephone call rates for phone calls between the person and the current participant.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

The claimed embodiments provide for preferential telephone calling rates for communications that occur between a person and members of his family. This may be achieved, via some implementations, when the person is eligible for preferential rates. In some embodiments, the person may have become a resident of a secure facility and, due to that residency status, is then eligible for the preferential rates. For the person and his family members to receive the preferential rates, family members, in various implementations may apply in order to prove they are related to the person. Additional documentation may also be solicited if circumstances require proof of address, proof of phone service, identity verification and so forth. In one implementation, preferential rates are provided to immediate family members of the person. In another implementation, preferential rates are provided to immediate and extended family members.

In one embodiment, family members are auto-enrolled and there may be an optional verification process at a later time. In another embodiment, preferential rates may be provided to others such as clergy, lawyers and/or government agency workers.

Exemplary methods for utilizing the claimed preferential pricing embodiments will be further described in a later section. Firstly, FIGS. 1-6 will now be presented. FIGS. 1-6 are schematic diagrams of an example secure facility call management system that may be used in conjunction with the claimed embodiments.

Figure 1:
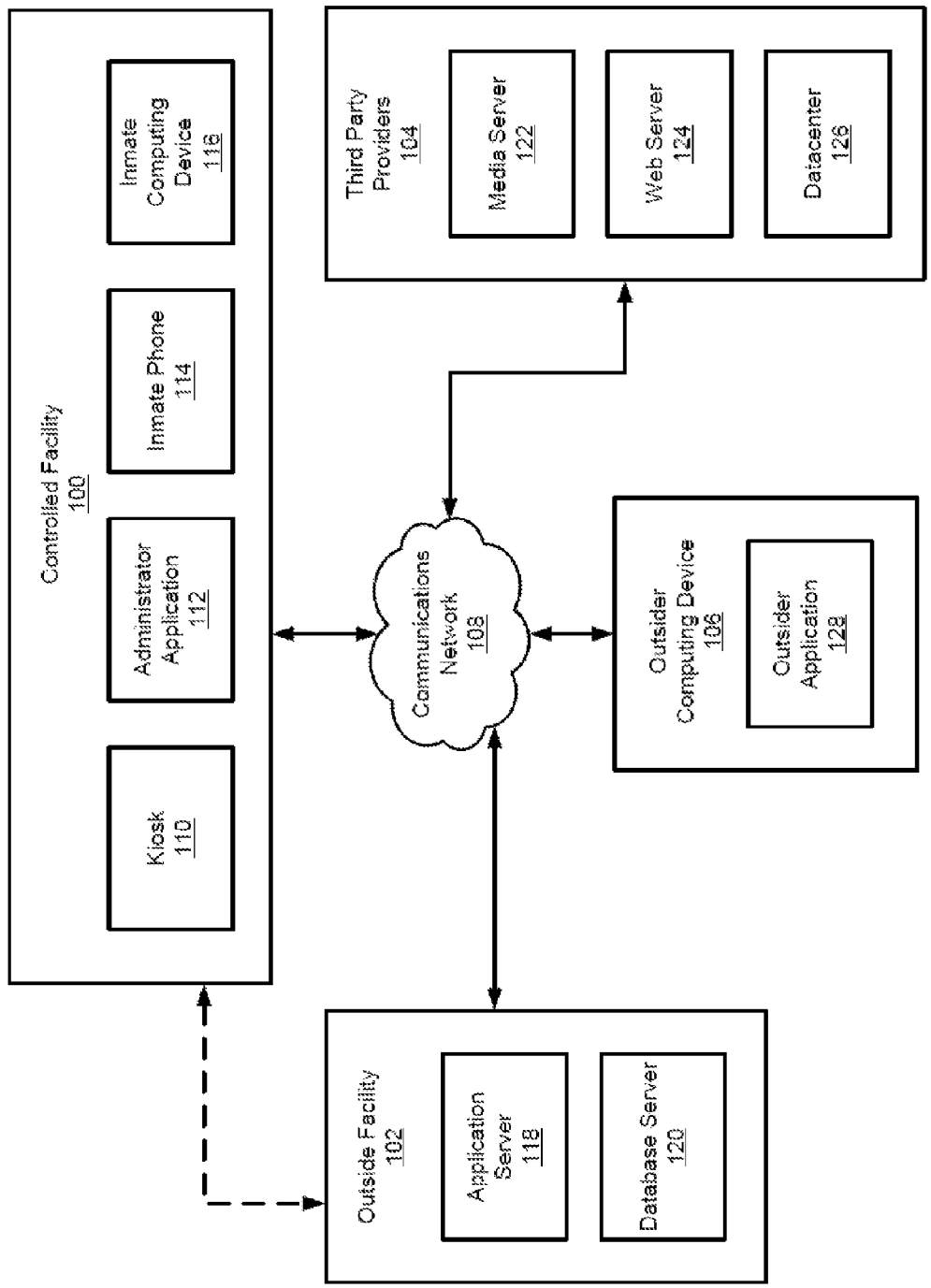
FIGS. 1-6 are schematic diagrams of an example secure facility call management system that may be used in conjunction with the claimed embodiments.

FIG. 1 shows a diagram of a system in accordance with at least one implementation of the claimed embodiments. As shown in FIG. 1, the system includes a controlled facility (100), an outside facility (102), third party providers (104), and an outsider computing device (106) each communicatively coupled to a communications network (108). The controlled facility (100) may include, but is not limited to, a kiosk (110), an administrator application (112), an inmate phone (114), and an inmate computing device (116). The outside facility (102) may include an application server (118) and a database server (120). The third party providers (104) may include a media server (122), a web server (124), and a datacenter (126). The outsider computing device (106) may include an outsider application (128).

In at least one implementation of the claimed embodiments, a controlled facility (100) is an access-restricted location. Examples of controlled facilities (e.g., controlled facility (100)) include, but are not limited to, detention environments (e.g., jails, prisons, etc.), immigration detention centers, military centers, government secure sites, law enforcement holding structures, secure business complexes, and psychiatric hospitals.

In at least one implementation of the claimed embodiments, an inmate is a person within a controlled facility (100) who is subject to one or more restrictions, primarily to his or her freedom or rights. Examples of inmates include, but are not limited to, prisoners, wards of the state, parolees, employees working in a secure business complex, temporary or long-term internees, patients, military personnel, uncharged suspects, and refugees. Inmate restrictions may be part of a court-imposed sentence on an inmate, while others may be specific to the controlled facility (100) in which the inmate resides. Restrictions may include limitations on an inmate's physical movement (i.e., physical restrictions) and limitations on the inmate's ability to communicate (i.e., communication restrictions). Communication restrictions include inmate use restrictions, inmate target restrictions, and device use restrictions.

In at least one implementation of the claimed embodiments, inmate use restrictions are limitations on an inmate's general ability to communicate with visitors and/or outsiders. Inmate use restrictions may include, for example, periods of time in which an inmate is not allowed to communicate with outsiders or visitors (e.g., between 10 PM and 8 AM, during an imposed one-week punitive period, etc.) and limitations based on lack of funds (e.g., insufficient commissary account balance to initiate a communication).

In at least one implementation of the claimed embodiments, inmate target restrictions are limitations on the target or source of a communication with the inmate. Inmate target restrictions may be specific outsiders or visitors with whom the inmate is not allowed to communicate (e.g., the victim of a crime perpetrated by the inmate, etc.). Inmate target restrictions may also include types of people with whom the inmate is not allowed contact (e.g., outsiders who are ex-cons, minors under the age of 18, etc.).

In at least one implementation of the claimed embodiments, device use restrictions are restrictions based on the condition or state of the communication device used by the inmate. Device use restrictions include, for example, limitations based on the location of the inmate's mobile device, limitations imposed based on a determination that the device has been tampered with, etc.

In at least one implementation of the claimed embodiments, an outsider is a person outside the controlled facility (100) who may be the source or target of a communication with an inmate. An outsider who enters the controlled facility (100) for the purpose of communicating with an inmate is referred to as a visitor.

In at least one implementation of the claimed embodiments, the kiosk (110) is a computing system with functionality to facilitate communication between an inmate and a visitor or outsider. Such communication facilitation may include creating a system identity data item or secure social networking account, adding or importing contact information for outsiders with whom the inmate wishes to communicate, uploading media (e.g., photos, videos, audio, and text) to, or viewing media from, a secure social network, sending or receiving messages or other media, acting as an endpoint for voice and video communication between an inmate and a visitor or outsider, scheduling a communication, and managing a commissary or communications account. Further detail about kiosks (e.g., kiosk (110)) is provided in FIG. 2, FIG. 5A, FIG. 5B, and FIG. 6. Kiosks may also, in some implementations, be deployed outside of controlled facility 100.

In at least one implementation of the claimed embodiments, the administrator application (112) is a process or group of processes executing on a computing system with functionality to enable an administrator to create, remove, and/or enforce one or more restrictions on an inmate. In at least one implementation of the claimed embodiments, an administrator is a person associated with the controlled facility charged with enforcing one or more restrictions. Examples of administrators include, but are not limited to, prison guards, orderlies, wardens, prison staff, jailers, information technology technicians, system administrators, and law enforcement agents. Using the administrator application, an administrator may retrieve or alter the identity data item and/or secure social network account of an inmate, visitor, or outsider. Further detail about the administrator application (112) is provided in FIG. 2.

In at least one implementation of the claimed embodiments, the inmate phone (114) is a device with functionality to send and receive audio communications between an inmate and an outsider or visitor. In at least one implementation of the claimed embodiments, the inmate phone (114) is a stationary (i.e., non-mobile) device. Further, a single inmate phone (114) may be used by more than one inmate. Further detail about the inmate phone (114) is provided in FIG. 2.

In at least one implementation of the claimed embodiments, the inmate computing device (116) is a computing device with functionality to enable an inmate to communicate with a visitor or outsider. Specifically, the inmate computing device (116) may be used to send or receive text messages and/or initiate or receive voice or video calls. In at least one implementation of the claimed embodiments, the inmate computing device (116) also enables an inmate to access a secure social network. Specifically, the inmate computing device (116) may be used to upload media to, or view media from, a secure social network account of the inmate or another secure social network member. In at least one implementation of the claimed embodiments, the inmate computing device (116) is a mobile computing device (e.g., a smartphone, a laptop, a tablet, etc.). Further detail about the inmate computing device (116) is provided in FIG. 2 and FIG. 6.

In at least one implementation of the claimed embodiments, the elements within the controlled facility (100) are communicatively coupled to the communications network (108). In at least one implementation of the claimed embodiments, the communications network (108) is a collection of computing systems and other hardware interconnected by communication channels. The communications network (108) may include networks that are exclusively or primarily used for a single type of communication, such as a telephone network (e.g., Plain Old Telephone System (POTS)), and/or networks used for a wide array of communication types, such as the Internet through Voice over IP (VOIP). Communication channels used by the communications network (108) may include, for example, telephone lines, networking cables, wireless signals, radio waves, etc. Fees charged and payments received by the provider(s) of the communications network (108) may involve multiple parties, including a service provider of the outside facility (102), the management of the controlled facility (100), and provider(s) of the communications network (108). In at least one implementation of the claimed embodiments, fees may be split between multiple parties based on the terms of underlying agreements or contracts between the parties. Further, rebates, reimbursements, and/or refunds may be afforded to and paid to the management of the controlled facility (100) based on the terms of underlying agreements or contracts between the parties. For example, the management of the controlled facility (100) may receive a rebate from the service provider of the services provided to inmates based on such factors as the volume of use, the dollar amount, and/or the frequency of use.

In at least one implementation of the claimed embodiments, the outside facility (102) is a group of computing systems located outside of the controlled facility (100). Specifically, the outside facility (102) may house system elements with functionality to facilitate communication between inmates and outsiders, access communication data between inmates and outsiders, and enforce one or more restrictions imposed on inmates and inmate communications. In at least one implementation of the claimed embodiments, the outside facility (102) is connected directly to the controlled facility (100) bypassing a generally accessible communications network (communications network (108)). One or more of the components within the outside facility (102) may alternatively be located within the controlled facility (100) or within the third party providers (104).

In at least one implementation of the claimed embodiments, the application server (118) is a computing system with functionality to authenticate an inmate, outsider, administrator, reviewer, or investigator for access to system functionality (e.g., initiating voice or video calls, sending text messages, etc.) or data stored on the database server (120) (e.g., inmate identities, communications between inmates and outsiders, etc.). The application server may authenticate inmates, outsiders, administrators, reviewers, and/or investigators using passwords, biometric data, digital access codes, and/or physical access devices. Further detail about the application server (118) is provided in FIG. 3.

In at least one implementation of the claimed embodiments, the database server (120) is a computing system with functionality to store identities used to authenticate inmates, outsiders, administrators, reviewers, and/or investigators. Such identities may include verified data used to compare to verification data provided by the inmate, outsider, administrator, reviewer, or investigator to authenticate the inmate, outsider, administrator, reviewer, or investigator.

In at least one implementation of the claimed embodiments, the database server (120) also stores communication data about communications between an inmate and an outsider or visitor. Such communication data may include, for example, a recording of a video call, the length of a voice call, the frequency of video calls, sent and received text messages, etc. The database server (120) may also store media submitted to a secure social network before, during, and/or after the media has been reviewed. Further detail about the database server (120) is provided in FIG. 3.

In at least one implementation of the claimed embodiments, the third party providers (104) are computing systems that provide network application and data storage services (i.e., cloud computing services). Third party providers (104) may include service providers used directly by inmates and outsiders, such as photo sharing services, general social networking sites, and digital music retailers. Third party providers (104) may include service providers employed by administrators and for use by inmates and outsiders, such as audio and video streaming applications, conferencing applications, and secure social network media storage. One or more of the components within the third party providers (104) may alternatively be located within the controlled facility (100) or the outside facility (102).

In at least one implementation of the claimed embodiments, the media server (122) is a computing system or group of computing system with functionality to provide network application services to facilitate communication between an inmate and an outsider, and to facilitate access to a secure social network. Such services include, but are not limited to, VoIP services, video conferencing services, and media streaming services.

In at least one implementation of the claimed embodiments, the web server (124) is a computing system or group of computing system with functionality to provide an interface to access and interact with webpages and other network application services. In at least one implementation of the claimed embodiments, the web server (124) is a type of media server (122).

In at least one implementation of the claimed embodiments, the datacenter (126) is a computing system or group of computing system with functionality to provide an interface to access and interact with data stored on one or more data servers (not shown). In at least one implementation of the claimed embodiments, the datacenter (126) is a type of media server (122).

In at least one implementation of the claimed embodiments, the outsider computing device (106) is a computing device with functionality to execute the outsider application (128). In at least one implementation of the claimed embodiments, the outsider computing device (106) is a mobile computing device (e.g., a smartphone, a laptop, a tablet, etc.). Further detail about the outsider computing device (106) is provided in FIG. 6.

In at least one implementation of the claimed embodiments, the outsider application (128) is a process or group of processes (in software, firmware, hardware, or combination thereof) with functionality to enable communication between an outsider and an inmate. Specifically, the outsider application (128) may be used to send or receive text messages and/or initiate or receive voice or video calls. In at least one implementation of the claimed embodiments, the outsider application (128) also enables an outsider to access a secure social network. Specifically, the outsider application (128) may be used to upload media to, or view media from, a secure social network account of the outsider, an inmate, other secure social network member.

Figure 2:
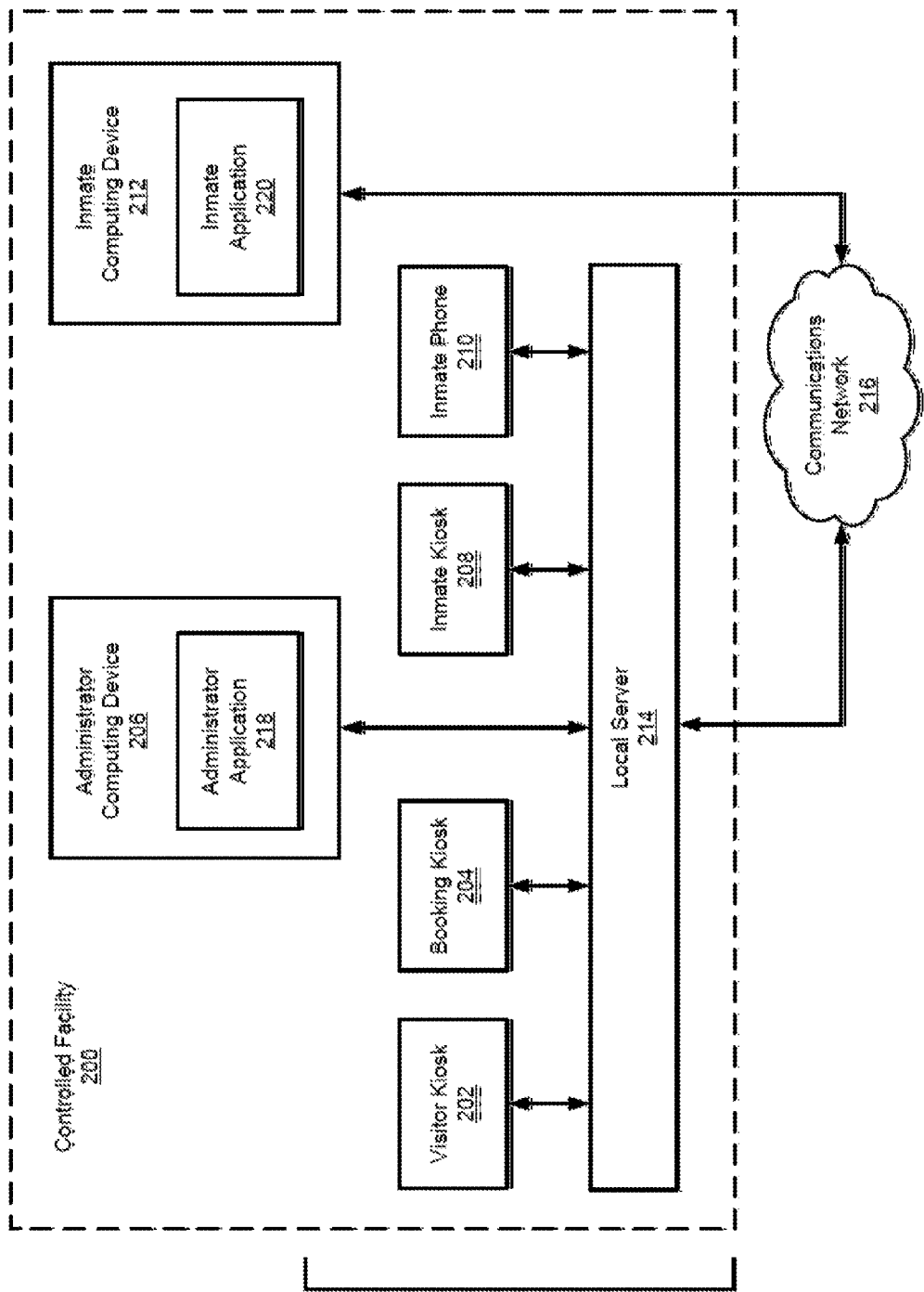

FIG. 2 shows a controlled facility in accordance with at least one implementation of the claimed embodiments. As shown in FIG. 2, the controlled facility (200) may include a visitor kiosk (202), a booking kiosk (204), an administrator computing device (206), an inmate kiosk (208), an inmate phone (210), an inmate computing device (212), and a local server (214). The inmate computing device (212) and the local server (214) are communicatively coupled to the communications network (216). The administrator computing device (206) includes an administrator application (218). The inmate computing device (212) includes an inmate application (220).

In at least one implementation of the claimed embodiments, the visitor kiosk (202) is a computing system with functionality to facilitate communication between an inmate and a visitor. Specifically, the visitor kiosk (202) may be a combination of computing hardware and software used by a visitor to make and receive voice and video calls to/from an inmate residing in the same controlled facility (200) or another controlled facility (not shown). The visitor kiosk (202) may also be used to schedule a voice or video call with an inmate for a future date. Further, the visitor kiosk (202) may also include the functionality to exchange media (e.g., photos, videos, and audio) with an inmate residing in the controlled facility (200). The visitor kiosk (202) may include functionality to generate such media, such as a camera, microphone, keyboard, and software to record or otherwise create media to send to an inmate. Such media may be subject to review before being delivered.

In at least one implementation of the claimed embodiments, a visitor wanting to use a visitor kiosk (202) may be required to participate in an authentication process to verify the identity of the visitor. The authentication process may include creating an identity data item and verified data for storage and later comparison. The verified data used for authentication may be a username and password combination and/or biometric information about the visitor.

In at least one implementation of the claimed embodiments, the visitor kiosk (202) includes functionality to access a secure social network. Specifically, the visitor kiosk (202) may be used by a visitor to create and manage a secure social network account. The visitor kiosk (202) may also be used by a visitor to upload digital media to the visitor's secure social network account or the account of another secure social network member. The visitor kiosk (202) may further be used to view digital media uploaded to the visitor's social network account or the account of another secure social network member.

In at least one implementation of the claimed embodiments, the visitor kiosk (202) includes functionality to manage a commissary account for one or more inmates. Specifically, a visitor may use a visitor kiosk (202) to add money to the commissary account of an inmate in the controlled facility (200), view a transaction history of the commissary account, transfer funds between commissary accounts, and/or remove funds from a commissary account. Further detail about the visitor kiosk (202) is provided in FIG. 5A and FIG. 5B.

In at least one implementation of the claimed embodiments, the booking kiosk (204) is a computing system with functionality to aid administrators in admitting an inmate into a controlled facility (e.g., controlled facility (200)). Specifically, the booking kiosk (204) may include functionality to create or update an inmate identity data item. Specifically, the booking kiosk (204) may be used to obtain verified data (e.g., passwords, biometric data, etc.) and save the verification data in one or more identity data items for the inmate. The verified data may then be used to authenticate the inmate (e.g., to access the communications network (216), etc.). In at least one implementation of the claimed embodiments, the booking kiosk may also be used to associate one or more restrictions with the inmate via the inmate's identity data item.

In at least one implementation of the claimed embodiments, the booking kiosk (204) includes functionality to input contact information for visitors, outsiders, administrators, or other inmates with whom the inmate wants to communicate. Such contact information may then be associated with the inmate's identity data item, and may be used to initiate a voice or video call, or otherwise transmit media to visitors, outsiders, or other inmates. Further, in at least one implementation of the claimed embodiments, the contact information may be retrieved from an inmate's mobile computing device (e.g., cell phone, smart phone, etc.) or a local or remote data storage device (e.g., a flash drive, a webmail account, etc.). The contact information may be retrieved using a wired or wireless connection between the booking kiosk and the inmate's mobile computing device and/or the data storage device. The contact information may be subject to review before the inmate is permitted to contact the visitor, outsider, administrator, or other inmate.

In at least one implementation of the claimed embodiments, the booking kiosk (204) includes functionality to prepare a mobile computing device for use by the inmate within the controlled facility (200). Specifically, a controlled facility (200) may allow inmates the use of computing devices while in or subject to the controlled facility (200). However, use of such inmate computing devices may require that the computing device is instrumented with software restricting the use of the inmate computing device. The booking kiosk (204) may be used to instrument the inmate computing device as required. Further detail about the booking kiosk (204) is provided in FIG. 5A and FIG. 5B.

In at least one implementation of the claimed embodiments, the administrator computing device (206) is a computing system or group of computing systems with functionality to execute the administrator application (218). In at least one implementation of the claimed embodiments, the administrator application (218) is a process or group of process with functionality to provide access to communications between inmates at the controlled facility (200) and visitors, outsiders, administrator, and other inmates. The administrator application (218) may also be used to monitor current voice or video calls between an inmate and a visitor, outsider, administrator, or other inmate.

In at least one implementation of the claimed embodiments, the administrator application (218) is used to manage an identity data item associated with an inmate. Such management may include altering the restrictions (device use restrictions, inmate use restrictions, and inmate target restrictions) applicable to the inmate. In at least one implementation of the claimed embodiments, the administrator application (218) is used to access the secure social network account of an inmate, visitor, or outsider. In at least one implementation of the claimed embodiments, the administrator application (218) may provide heightened access (i.e., a level of access greater than that of the inmate, visitor, or outsider) to data stored in the secure social networking account.

In at least one implementation of the claimed embodiments, the inmate kiosk (208) is a computing system with functionality to facilitate communication between an inmate and a visitor or outsider. Specifically, the inmate kiosk (208) may be a combination of computing hardware and software used by an inmate to make and receive voice and video calls to/from a visitor, outsider, or another inmate residing in another controlled facility (not shown). The inmate kiosk (208) may also be used to schedule a voice or video call with a visitor at a future date. Initiating or scheduling a voice or video call may include determining whether the currently attempted call or the scheduled call are adverse to one or more restrictions (e.g., inmate use restrictions, device use restrictions, and/or inmate target restrictions). Further, the inmate kiosk (208) may also include the functionality to exchange media (e.g., photos, videos, and audio) with a visitor or outsider. The inmate kiosk (208) may include functionality to generate such media, such as a camera, microphone, keyboard, and software to record or otherwise create media to send to a visitor or outsider. Such media may be subject to review before being delivered.

In at least one implementation of the claimed embodiments, an inmate wanting to use an inmate kiosk (208) may be required to participate in an authentication process to verify the identity of the inmate. The authentication process may include providing verification data for comparison to verified data previously obtained from the inmate and stored in the inmate identity data item. The verified data may be a username and password combination and/or biometric information about the inmate.

In at least one implementation of the claimed embodiments, the inmate kiosk (208) includes functionality to access a secure social network. Specifically, the inmate kiosk (208) may be used by an inmate to manage a secure social network account. The inmate kiosk (208) may include functionality to generate such media, such as a camera, microphone, keyboard, and software to record or otherwise create media to send to a visitor or outsider. The inmate kiosk (208) may also be used by an inmate to upload digital media to the inmate's secure social network account or the account of another secure social network member. The inmate kiosk (208) may further be used to view digital media uploaded to the inmate's social network account or the account of another secure social network member. Uploaded media may be subject to review before posting.

In at least one implementation of the claimed embodiments, the inmate kiosk (208) includes functionality to manage a commissary account for the inmate. Specifically, an inmate may use an inmate kiosk (208) to view a transaction history of the commissary account and/or to apply commissary funds for goods and services consumed or enjoyed by the inmate. Further detail about the inmate kiosk (208) is provided in FIG. 5A and FIG. 5B.

In at least one implementation of the claimed embodiments, the inmate phone (210) is a device with functionality to send and receive audio communications between an inmate and an outsider or visitor. The inmate phone (210) may be implemented as handset connected to a telephone line. In at least one implementation of the claimed embodiments, all or part of the voice call may be conducted over a VoIP connection. In at least one implementation of the claimed embodiments, a single inmate phone (210) is utilized by multiple inmates.

In at least one implementation of the claimed embodiments, initiating or receiving a voice call using the inmate phone (210) requires a form of authentication (e.g., providing a password, personal identification number, or voice verification). In at least one implementation of the claimed embodiments, voice calls made using the inmate phone (210) are monitored by one or more administrators using the administrator computing device (206), and are recorded and stored in a data storage system within the controlled facility (200), within the outside facility (not shown), or within a third party provider (not shown). The inmate phone (210) may also be subject to device use restrictions limiting the ability to use the inmate phone (210) at certain times (e.g., between 9 PM and 8 AM) or under certain conditions (e.g., emergency lockdown).

In at least one implementation of the claimed embodiments, the identity of the visitor or outsider targeted by the inmate or attempting to contact the inmate using the inmate phone (210) is verified against inmate target restrictions imposed on the inmate. Such restrictions may be associated with the inmate's identity data item and may be stored locally within the controlled facility (200), within the outside facility (not shown), or within a third party provider (not shown). The visitor or outsider identity may be verified by the local server (214) or by another server within the outside facility (not shown), or within a third party provider (not shown).

In at least one implementation of the claimed embodiments, the inmate computing device (212) is a computing system configured to execute the inmate application (202). In at least one implementation of the claimed embodiments, each inmate computing device (212) is utilized exclusively by a single inmate. In at least one implementation of the claimed embodiments, access to the inmate application requires a form of initial authentication. This initial authentication may use verification data stored locally on the inmate computing device (212) (e.g., a code or combination used to unlock the phone, locally stored biometric data, etc.).

In at least one implementation of the claimed embodiments, accessing a communications network (e.g., communications network (216)) using the inmate application (220) may require further network-based authentication. This further authentication may use verification data stored external to the inmate computing device (212) but locally within the controlled facility (200), or remotely within the outside facility (not shown) or within a third party provider (not shown).

In at least one implementation of the claimed embodiments, an authenticated inmate may use the inmate application to initiate or receive voice or video calls, initiate or receive text or media messages, schedule a voice or video call, manage a commissary account, or post media to a secure social network. In at least one implementation of the claimed embodiments, voice and video calls made using the inmate computing device (212) are monitored by one or more administrators using the administrator computing device (206), and are recorded and stored in a data storage system within the controlled facility (200), within the outside facility (not shown), or within a third party provider (not shown).

In at least one implementation of the claimed embodiments, the identity of the visitor or outsider targeted by the inmate or attempting to contact the inmate using the inmate computing device (212) is verified against inmate target restrictions imposed on the inmate. Such restrictions may be associated with the inmate's identity data item and may be stored locally within the controlled facility (200), within the outside facility (not shown), or within a third party provider (not shown). The visitor or outsider identity may be verified by the local server (214) or by another server within the outside facility (not shown), or within a third party provider (not shown).

In at least one implementation of the claimed embodiments, the inmate computing system (212) and/or the inmate application (220) may limit access to the communications network (216) based on one or more restrictions (inmate use restrictions, inmate target restrictions, and device use restrictions). Further, the inmate computing system (212) and/or the inmate application (220) may gather data from input devices of the inmate computing system (212) to determine whether one or more restrictions apply. Such input devices may include, for example, a system clock, a global positioning system antenna, a wide area network antenna, etc.

In at least one implementation of the claimed embodiments, the local server (214) is a computer system or group of computers systems located within the controlled facility (200) that facility communication between inmates and visitors, outsiders, and/or other inmates. Specifically, the local server (214) may implement the software necessary to host voice and video calls between and among the visitor kiosk (202), the inmate kiosk (208), the inmate phone (210), and an outsider computing system (not shown). The local server (214) may also include functionality to enforce communication restrictions associated with the inmates using the inmate kiosk (208) or inmate phone (210). Alternatively, the local server (214) may merely provide access to other systems capable of hosting the communication software and data storage (e.g., located within an offsite facility or a third party provider). Further, in at least one implementation of the claimed embodiments, the local server (214) includes functionality to regulate inmate access to a secure social network.

Figure 3:
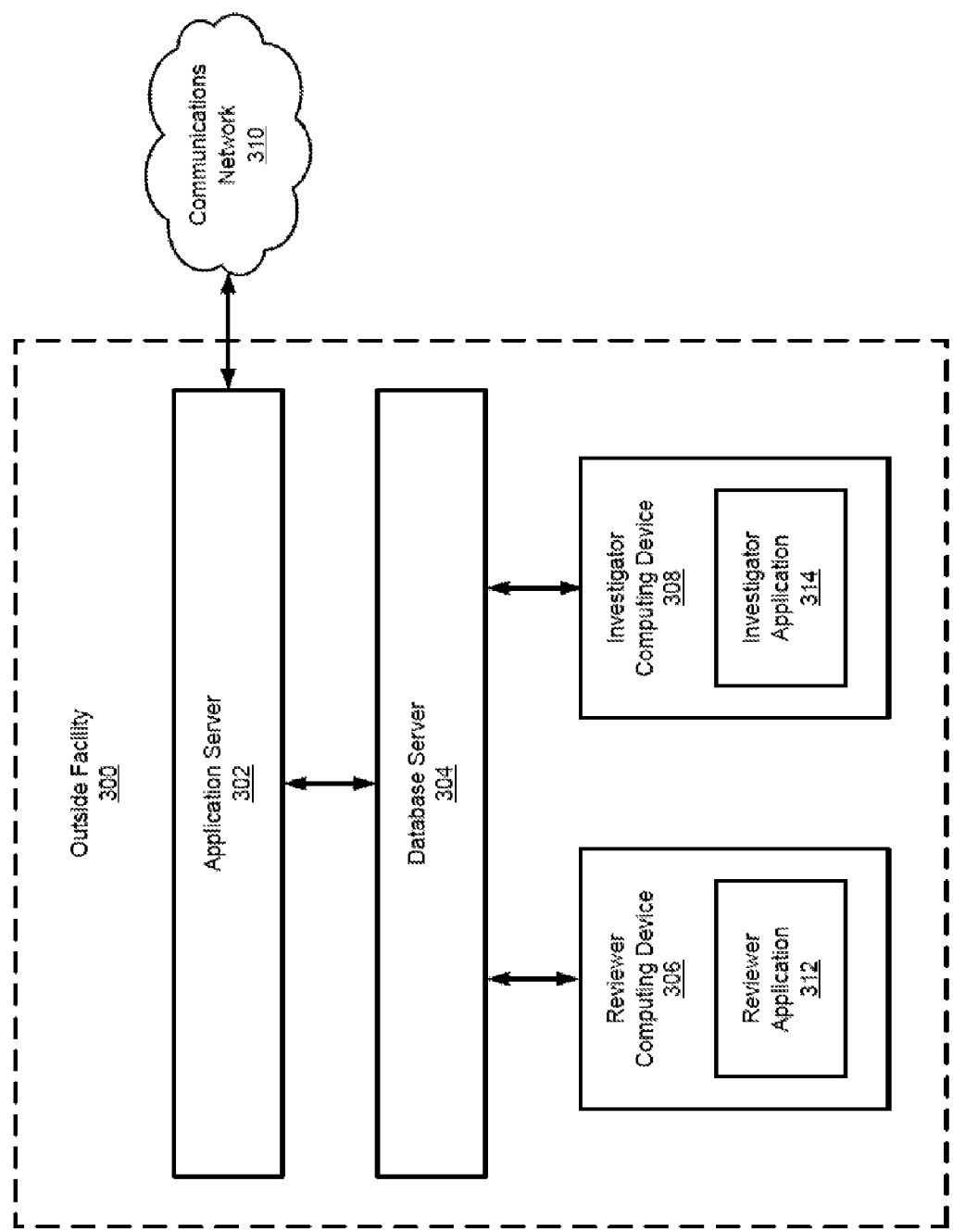

FIG. 3 shows an outside facility in accordance with at least one implementation of the claimed embodiments. As shown in FIG. 3, the outside facility (300) may include an application server (302), a database server (304), a reviewer computing system (306), and an investigator computing system (308). The application server (302) is communicatively coupled to the communications network (310). The reviewer computing device (306) may include a reviewer application (312), and the investigator computing device (308) may include an investigator application (314).

In at least one implementation of the claimed embodiments, the application server (302) is a computing system or group of computing systems configured to authenticate inmates, visitors, outsiders, administrators, reviewers, and/or investigators. Specifically, the application server (302) includes functionality to receive a request to authenticate an inmate, visitor, outsider, administrator, reviewer, and/or an investigator, retrieve verified data associated with the request, and compare the verified data to verification data submitted in the authentication request. In at least one implementation of the claimed embodiments, the application server provides access to identity data items and other data stored in the database server (304).

In at least one implementation of the claimed embodiments, the database server (304) is a computing system or group of computing system configured to store data about inmates, visitors, outsiders, administrators, reviewers, and/or investigators as well as communication data describing communications between and among inmates, visitors, outsiders, administrators, reviewers, and/or investigators. Data stored in the database server may include, but is not limited to, identity data items, verified data, approved communication media, communication media pending review In at least one implementation of the claimed embodiments, the reviewer computing device (306) is a computing system configured to execute the reviewer application (312). In at least one implementation of the claimed embodiments, a reviewer is a person charged with viewing a media item submitted by an inmate, visitor, outsider or administrator, and determining one or more attributes of the media item. Based on the determined attributes of the media item, the reviewer may then approve the media item for transmission to its target inmate, visitor, or outsider. Alternatively, the reviewer may reject the media item, conditionally approve the media item, or redact parts of the media item, thus preventing complete transmission to its target inmate, visitor, or outsider. In at least one implementation of the claimed embodiments, the reviewer application (312) include functionality to view media items, associate one or more attributes to the media item, and/or mark the media items as approved or rejected.

In at least one implementation of the claimed embodiments, the investigator computing device (308) is a computing system configured to execute the investigator application (314). In at least one implementation of the claimed embodiments, an investigator is a person gathering information about an inmate, visitor, or outsider generally for the purposes of law enforcement. The investigator application (314) includes functionality to provide access to data stored on the database server (304) for investigative purposes.

Figure 4:
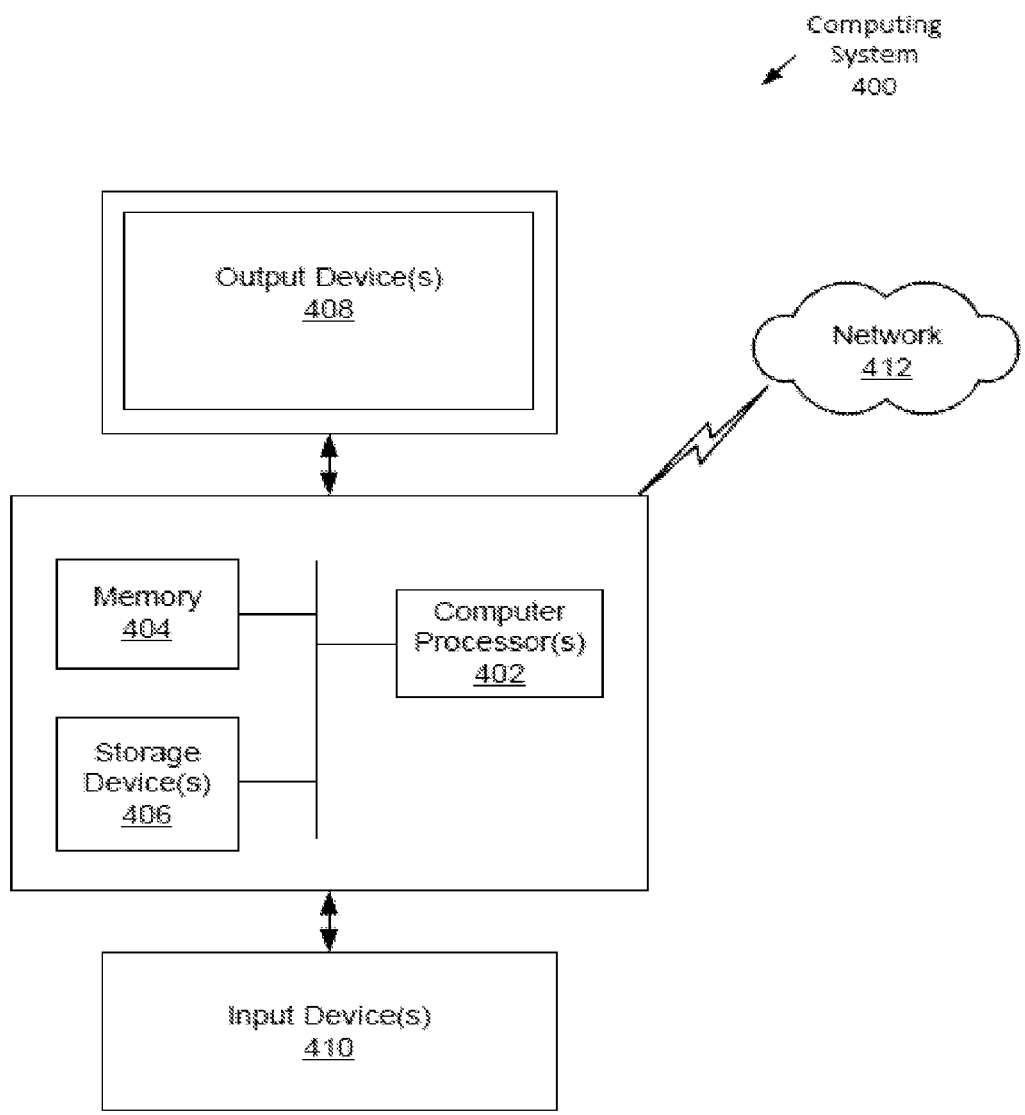

FIG. 4 shows a general computing system in accordance with at least one implementation of the claimed embodiments. As shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, camera, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (414) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (414). Further, embodiments of the invention may be implemented on a distributed system having a plurality of nodes, where each portion of the invention may be located on a different node within the distributed system. In at least one implementation of the claimed embodiments, the node corresponds to a distinct computing device. Alternatively, the node may correspond to a computer processor with associated physical memory. The node may alternatively correspond to a computer processor or micro-core of a computer processor with shared memory and/or resources.

Figure 5A:
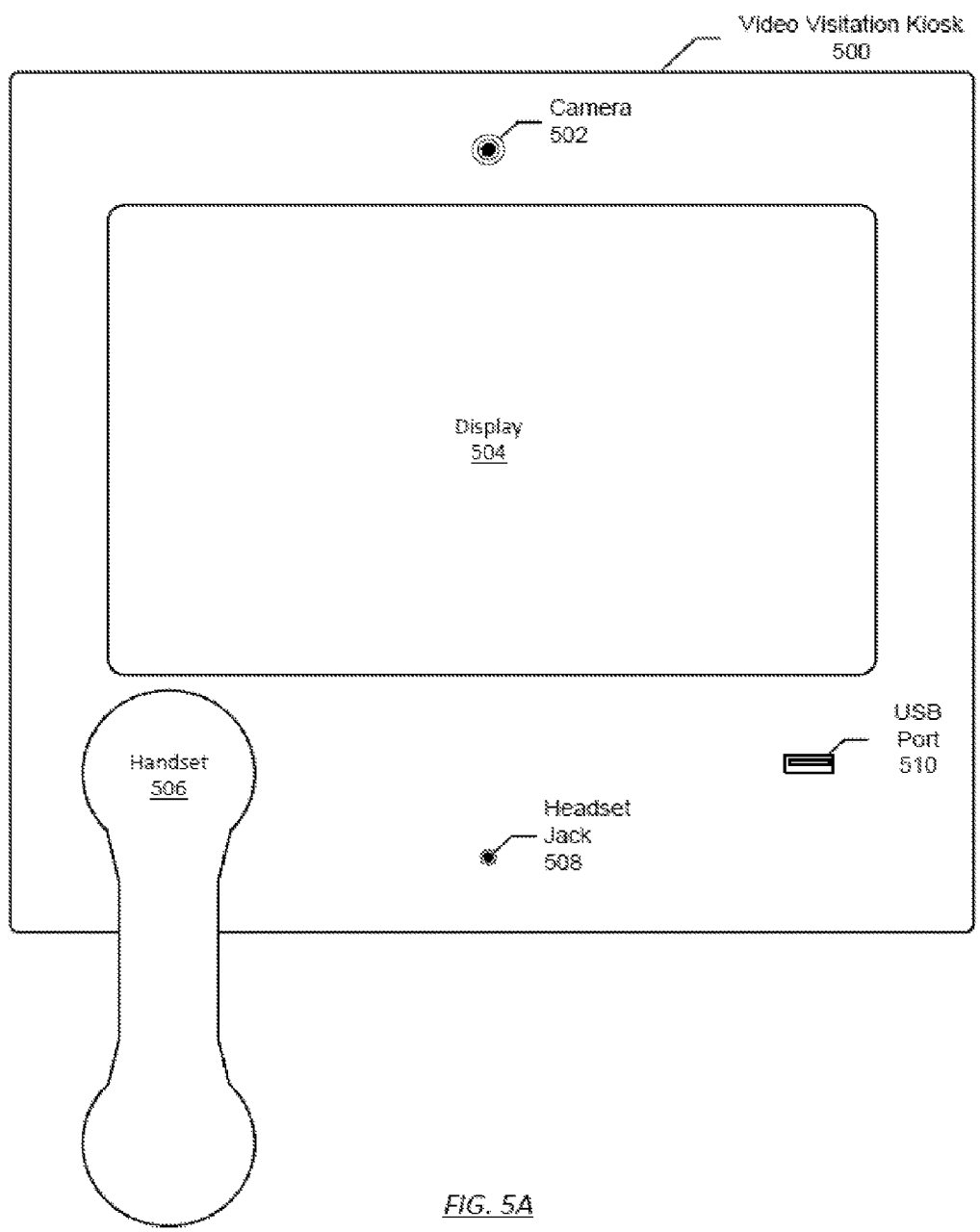

FIG. 5A shows a video visitation kiosk in accordance with at least one implementation of the claimed embodiments. Specifically, the video visitation kiosk (500) is a type of computing device as described in FIG. 4. As shown in FIG. 5A, the video visitation kiosk (500) includes a camera (502), a display (504), a handset (506), a headset jack (508), and a universal serial bus (USB) port (510).

Figure 5B:
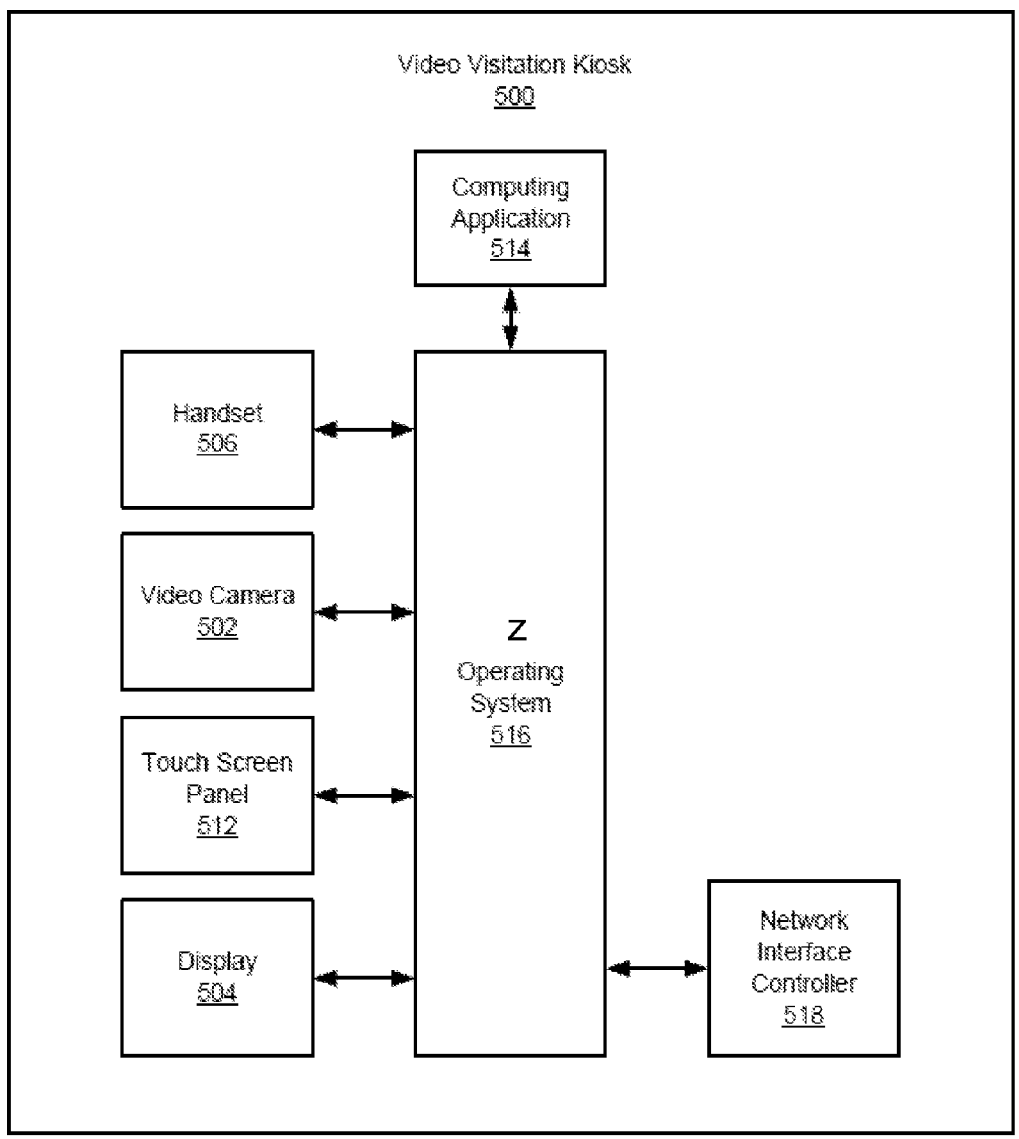

FIG. 5B shows the hardware and software elements of a video visitation kiosk in accordance with at least one implementation of the claimed embodiments. The hardware and software elements shown in FIG. 5B may be in addition to the elements described in FIG. 4. As shown in FIG. 5B, the video visitation kiosk (500) includes a handset (506), a video camera (502), a touch screen panel (512), a display (504), a computing application (514), an operating system (516), and a network interface controller (518).

Figure 6:
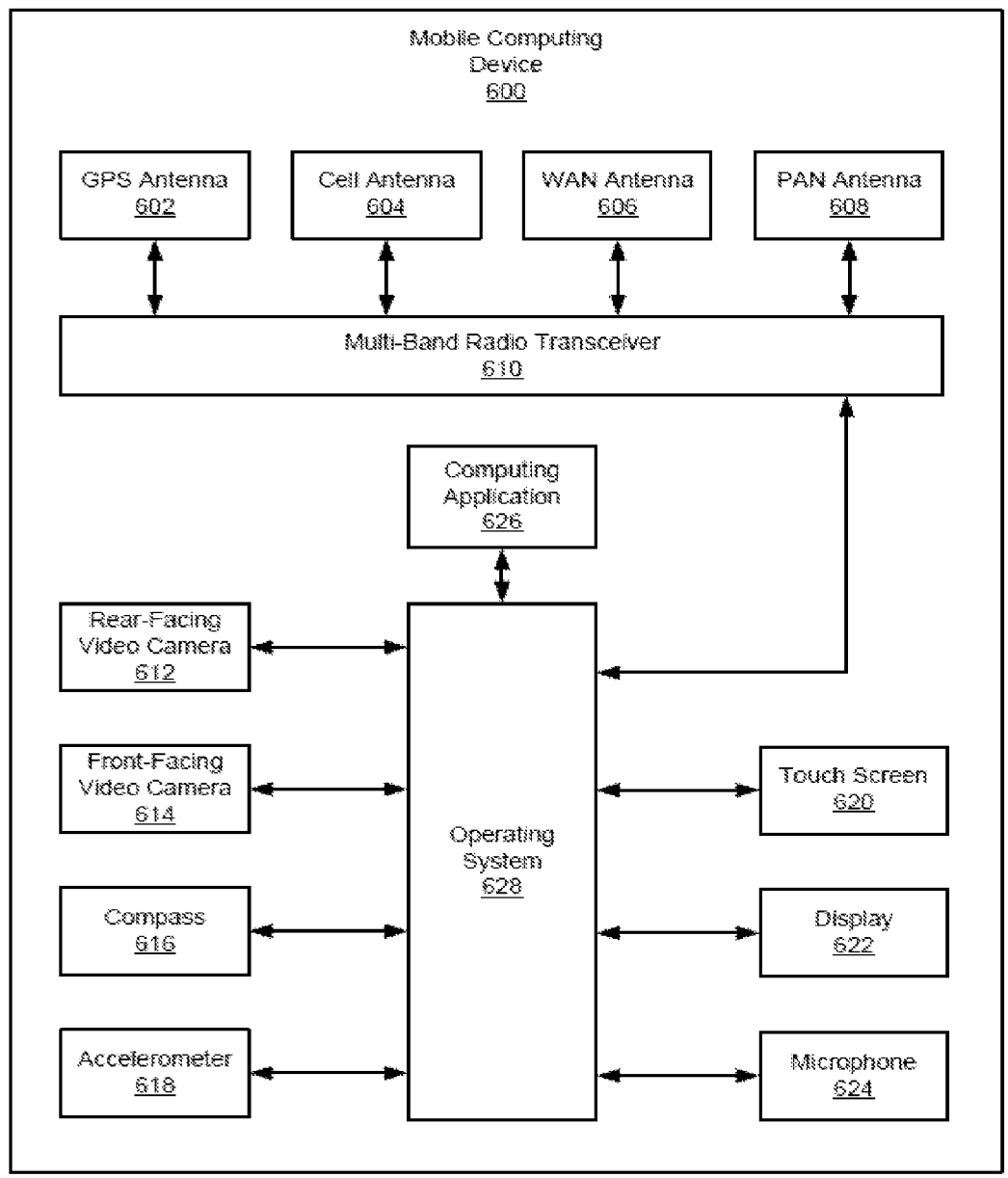

FIG. 6 shows the hardware and software elements of a mobile computing device in accordance with at least one implementation of the claimed embodiments. Specifically, the mobile computing device (600) is a type of computing device as described in FIG. 4. The hardware and software elements shown in FIG. 6 may be in addition to the elements described in FIG. 4.

As shown in FIG. 6, the mobile computing device (600) may include a global positioning system (GPS) antenna (602), a cell antenna (604), a wide area network (WAN) antenna (606), and a personal area network (PAN) antenna (608), each connected to a multi-band radio transceiver (610). The mobile computing device (600) also may include a rear-facing video camera (612), a front-facing video camera (614), a compass (616), an accelerometer (618), a touch screen (620), a display (622), and a microphone (624). The mobile computing device (600) also may include a computing application (626) executing on an operating system (628).

Figure 7:
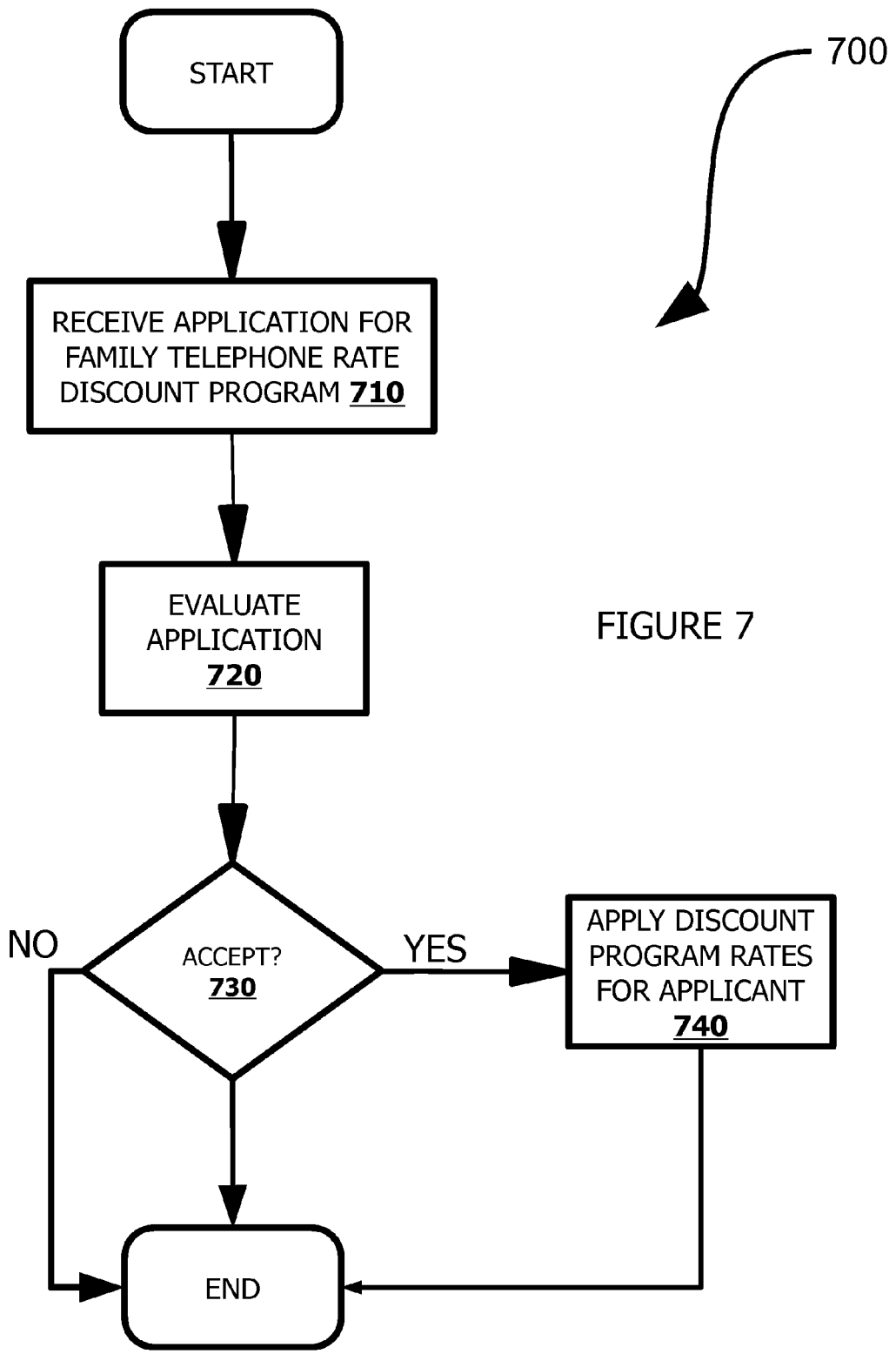
FIG. 7 is a flowchart diagram illustrating an implementation method for a familial-based discount telephonic rate program, in accordance with an exemplary embodiment.

Now that the example secure facility call management system, schematically shown in FIGS. 1-6, has been described, methods for implementing embodiments of preferential pricing will now be presented, starting with FIG. 7. FIG. 7 is a flowchart diagram 700 illustrating an implementation method for a familial-based discount telephonic rate program, in accordance with an exemplary embodiment. Beginning at an operation 710, method 700 receives an application for a family telephone rate discount program and evaluates the application at operation 720. If method 700 accepts the application via operation 730, then the applicant will receive discount program rates via operation 740. Otherwise the application is not accepted (730).

Figure 8:
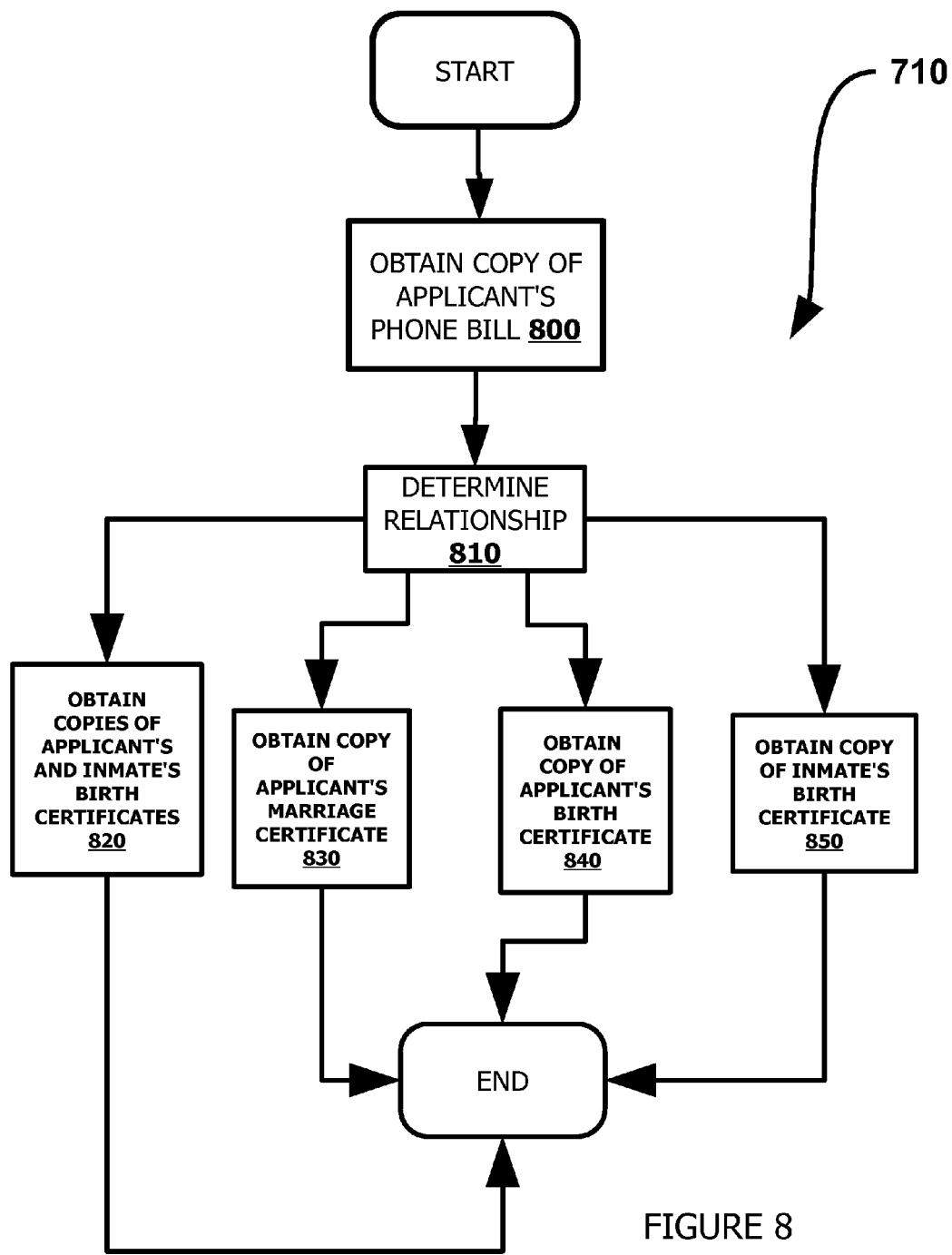
FIG. 8 is a flowchart diagram illustration a document collection operation of FIG. 7, in accordance with the claimed embodiments.

Aspects of receiving the application operation 710 are further described in FIG. 8. More specifically, the aspects of operation 710, depicted in FIG. 7, illustrate example documents to collect, in one implementation, as part of an application for preferential rates. More specifically, at an operation 800, a copy of the applicant's phone bill is obtained. This may serve several purposes some of which include home address verification, verifying the applicant's ID and perhaps also identifying a phone to which discount rates may be applied upon. In one embodiment, the applicant supplies a hardcopy. In one implementation, the applicant supplies a softcopy, submitted via email and/or a webpage submission. In yet another implementation, operations 710 and 800 may be accomplished, in part or entirely, via a kiosk such as kiosk 110 of FIG. 1. These are a few examples of how an applicant may supply documents for operations 710 and 800 or other similar operations. Other methodologies may be employed, in accordance with the claimed embodiments.

Next, determining or supplying proof of a familial relationship is commenced at operation 810. It should be noted that operations 800 and 810 may be done such that operation 810 may be specified to happen before operation 800. A type of relation (applicant to inmate) determines, in one implementation, whose copies of birth or marriage certificates are to be submitted. It should be noted that the implementation of operation 720 specifies for the documentation that an applicant should submit as part of their application. Verifying that the applicant is related to the inmate is later performed via operation 720.

If the applicant is a sibling of the inmate, copies of the both the applicant's and inmate's birth certificates are submitted via operation 820. The applicant and inmate, as being siblings, should have at least one parent's name in common on both birth certificates. If so, then their relationship as siblings has been established.

Via operation 830, an applicant, who is a spouse of the inmate, submits their marriage certificate. This document should list both of their names if they are indeed married. And in a somewhat similar fashion, if the applicant indicates that he or she is a child of the inmate, the applicant's birth certificate is obtained and check is performed to see if the name on the certificate matches either of the listed parents, via operation 840. Also, via operation 850, if the applicant indicates he or she is a parent of the inmate, the applicant submits a copy of the inmate's birth certificate. The submitted inmate's birth certificate is then checked to see if the applicant's name is specified as a parent of the inmate.

Operations 720 may also take into account, in some implementations, situations wherein a person's name has changed. For example, wives will typically adopt the surname of her husband upon marriage. If the inmate was born before the marriage or perhaps resulted from a previous relationship, the mother's last name may not match exactly to the specified mother's name listed on the birth certificate.

In another implementation, a copy of a tax return may be utilized for purposes of verifying familial relationships. For example, if an inmate had previously filed jointly and had dependent child deductions, the listed spouse name ad dependent's names, specified on the tax return may be utilized to enroll an applicant into a preferential pricing program.

In other implementations, family members may be pre-enrolled based on names of family members specified by the inmate. Verification of the specified names may then later be performed.

In yet another implementation, family members specified at a social network may be utilized to pre-enroll family members. In still other implementations, family members may be pre-enrolled via auto-discovery-type methods—calls to phone numbers whose billing party has a common last name, for example.

Figure 9:
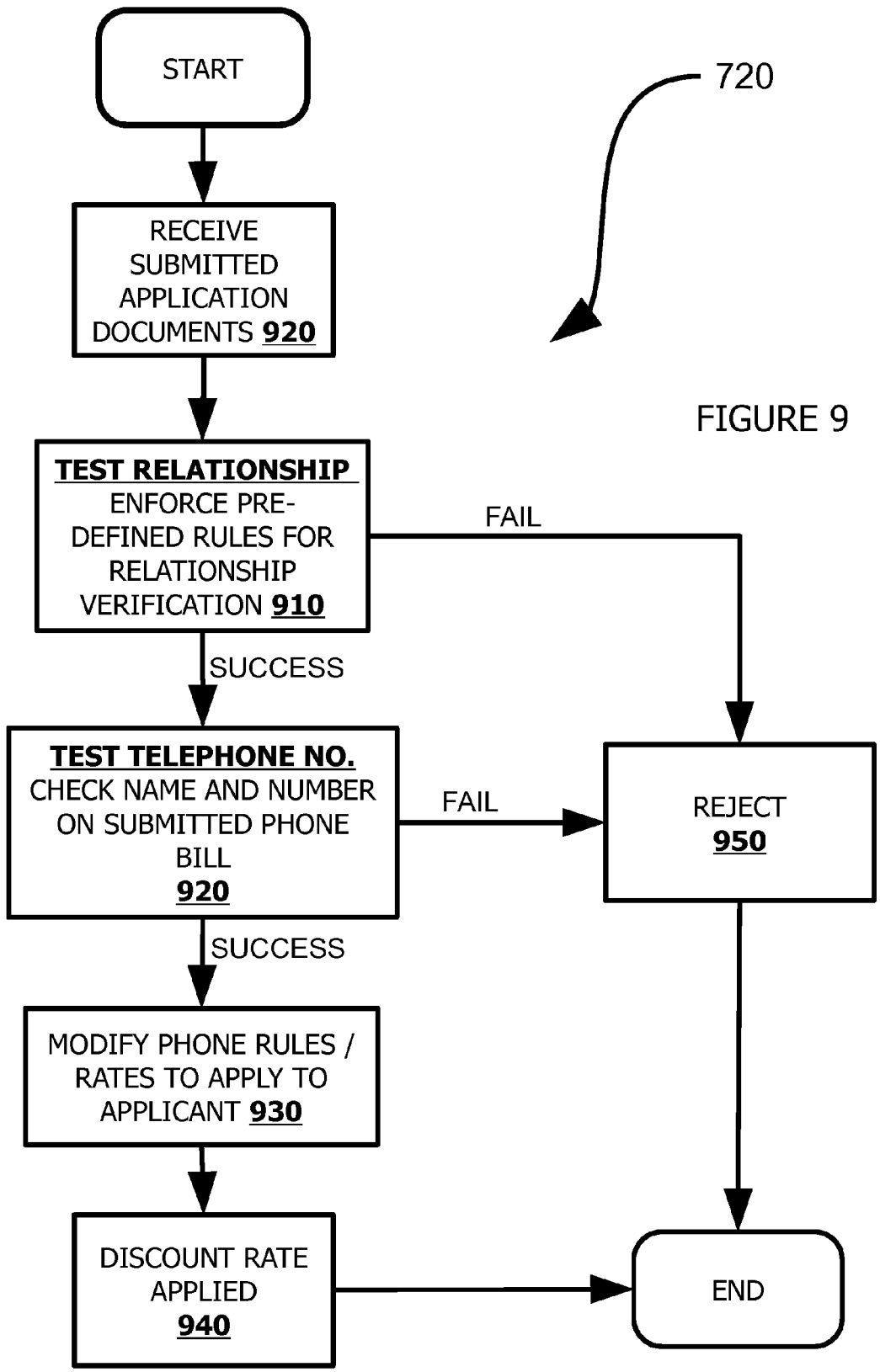
FIG. 9 is a flowchart diagram illustrating a submitted application evaluation operation of FIG. 7, in accordance with an exemplary embodiment.

Once the applicant's documents have been collected, via operation 710, they are then evaluated via operation 720 which is detailed via FIG. 9. After receiving the submitted application documents (900), applicant relationship to the inmate is verified via operation 910. As previously indicated, if the applicant is a sibling to the inmate, having one of their parent's names listed on both of their birth certificates verifies that relationship. For spouses, both names on a marriage certificate (applicant and inmate) suffices. For an applicant who is a child of the inmate, the inmate's name on the applicant's birth certificate satisfies verification for this relationship type. For parent's of an inmate, if a parent's name is on the inmates' birth certificate, that positively identifies the relationship.

If the applicant's submitted documents are not able to prove a pre-defined relationship rule, then the application is rejected via operation 950. If operation 910 is successful, the applicant's name and phone number listed on a submitted telephone bill is tested via operation 920. There may be various protocols to utilize for operation 920 such as ensuring the telephone number is operational and perhaps verifying that the applicant is able to use the specified telephone number. In one implementation, by way of non-limiting example, telephone verification may be accomplished by separately communicating a verification code to the applicant, placing a telephone call to the applicant's telephone number and requiring the applicant to enter the verification code via the telephone's keypad. If operation 920 is not successful, the application is rejected at operation 950. If operation 920 is a success, phone rules/rates are modified (930) and preferential discount rates are applied to the applicant 940.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for operating a secure facility call management system comprising:
   receiving a completed application for participation in a familial-based discount telephonic rate program;
   determining eligibility for the familial-based telephonic discount rate program based on the completed application, wherein eligibility is further based upon an applicant having a family member who is a participant in the familial-based discount telephonic rate program and the applicant being specified as a contact in a secure social network account of the family member;
   instrumenting, using a booking kiosk of the secure facility call management system, a mobile computing device of the family member with instrumented software to impose, using the secure facility call management system, a security restriction regarding a type of person that the family member is prohibited from contacting, wherein the family member resides at a controlled facility associated with the secure facility call management system,
   wherein the instrumented software of the mobile computing device verifies that communicating with the applicant does not violate the security restriction,
   wherein the booking kiosk obtains verification data used to authenticate the family member;
   obtaining a copy of a telephone bill of the applicant at the secure facility call management system;
   communicating a verification code to the applicant;
   placing a call, by the secure facility call management system and over a communications network, to a telephone number specified in the telephone bill; and
   requiring the applicant to enter the verification code using a telephone keypad, wherein determining eligibility is further based on receiving the verification code from the applicant.

2. The method as recited in claim 1 further comprising initially providing an application for participation in the familial-based discount telephonic rate program.

3. The method as recited in claim 2 wherein discounted telephone call rates of the familial-based discount telephonic rate program apply to phone calls that originate from the family member of the familial-based discount telephonic rate program to the applicant.

4. The method as recited in claim 1 wherein discounted telephone call rates of the familial-based discount telephonic rate program also apply to phone calls that originate from the family member of the familial-based discount telephonic rate program to relatives of the family member that join the familial-based discount telephonic rate program subsequent to the family member.

5. The method as recited in claim 1 wherein the family member is selected from the group consisting of a father, a mother, a sibling or a spouse.

6. The method as recited in claim 5 wherein the relationship between the applicant and the family member is based upon analysis of at least a birth certificate of the applicant or a birth certificate of the family member or a marriage certificate of the applicant.

7. The method as recited in claim 6 wherein the relationship is verified based on the birth certificate of the applicant.

8. The method as recited in claim 7 wherein the relationship is a parent-child relationship.

9. The method as recited in claim 8 the applicant is a parent of the family member or a child of the family member.

10. The method as recited in claim 9 wherein the relationship is verified if a name of the applicant and a name of the family member are both listed on the birth certificate of the applicant.

11. The method as recited in claim 6 wherein the relationship between the applicant and the family member is based upon analysis of both the birth certificate of the applicant and the birth certificate of the family member.

12. The method as recited in claim 11 wherein the relationship is a sibling relationship.

13. The method as recited in claim 12 wherein the relationship is verified if at least one parent name is common on both the birth certificate of the applicant and the birth certificate of the family member.

14. The method as recited in claim 6 wherein the relationship is verified based on the marriage certificate of the applicant.

15. The method as recited in claim 14 wherein the relationship is a spousal relationship and wherein the relationship is verified if the family member is listed on the marriage certificate of the applicant.

16. The method as recited in claim 6 wherein the completed application includes changed name information which is also utilized for verifying the relationship.

17. The method as recited in claim 6 wherein the relationship between the applicant and the family member is based upon analysis of a tax return of the applicant.

18. The method as recited in claim 15 wherein the relationship is verified if the family member is a claimed dependent as listed on the tax return of the applicant.

19. The method as recited in claim 1 wherein discounted telephone call rates of the familial-based discount telephonic rate program applies to phone calls that originate from one family member of the familial-based discount telephonic rate program.

20. The method as recited in claim 19 wherein the one family member resides in a secure facility wherein the secure facility is a prison.

21. A method for operating a secure facility call management system comprising:
   instrumenting, using a booking kiosk of the secure facility call management system, a mobile computing device of the family member with instrumented software to impose, using the secure facility call management system, a security restriction regarding a type of person that a current participant is prohibited from contacting, wherein the current participant resides at a controlled facility associated with the secure facility call management system, wherein the instrumented software of the mobile computing device verifies that communicating with a person does not violate the security restriction, wherein the booking kiosk obtains verification data used to authenticate the family member;

obtaining a copy of a telephone bill of the person at the secure facility call management system;

communicating a verification code to the person;

placing a call, by the secure facility call management system and over a communications network, to a telephone number specified in the telephone bill;

requiring the person to enter the verification code using a telephone keypad;

adding, based on receiving the verification code from the person and the person being specified as a contact in a secure social network account of the current participant, the person to a familial-based discount telephonic rate program as a relative to the current participant; and providing discounted telephone call rates for phone calls between the person and the current participant.

22. The method as recited in claim 21 further comprising initially receiving an indication that the person is related to the current participant of the familial-based discount telephonic rate program.

23. A method for operating a secure facility call management system comprising:

receiving an indication that a person has an existing association with a current participant of a pre-defined relationship-based discount telephonic rate program;

instrumenting, using a booking kiosk of the secure facility call management system, a mobile computing device of the family member with instrumented software to impose, using the secure facility call management system, a security restriction regarding a type of person that the family member is prohibited from contacting, wherein the family member resides at a controlled facility associated with the secure facility call management system, wherein the instrumented software of the mobile computing device verifies that communicating with the person does not violate the security restriction, wherein the booking kiosk obtains verification data used to authenticate the family member;

obtaining a copy of a telephone bill of the person at the secure facility call management system;

communicating a verification code to the person;

placing a call, by the secure facility call management system and over a communications network, to a telephone number specified in the telephone bill;

requiring the person to enter the verification code using a telephone keypad;

adding, based on receiving the verification code from the person and the person being specified as a contact in a secure social network account of the current participant, the person to the pre-defined relationship-based discount telephonic rate program as being associated with the current participant; and providing discounted telephone call rates for phone calls between the person and the current participant.

24. The method as recited in claim 23 wherein the existing association is a familial association.

25. The method as recited in claim 23 wherein the existing association is a religion member to clergy member association.

26. A system for operating a secure facility call management system, comprising:

a processor, and a memory comprising instructions that, when executed by the processor, cause the processor to:

receive a completed application for participation in a familial-based discount telephonic rate program;

determine eligibility for the familial-based telephonic discount rate program based on the completed application, wherein eligibility is further based upon an applicant having a family member who is a participant in the familial-based discount telephonic rate program and the applicant being specified as a contact in a secure social network account of the family member;

instrument, using a booking kiosk of the secure facility call management system, a mobile computing device of the family member with instrumented software to impose, using the secure facility call management system, a security restriction regarding a type of person that the family member is prohibited from contacting, wherein the family member resides at a controlled facility associated with the secure facility call management system, wherein the instrumented software of the mobile computing device verifies that communicating with the applicant does not violate the security restriction, wherein the booking kiosk obtains verification data used to authenticate the family member;

obtain a copy of a telephone bill of the applicant at the secure facility call management system;

communicate a verification code to the applicant;

place a call, by the secure facility call management system and over a communications network, to a telephone number specified in the telephone bill; and require the applicant to enter the verification code using a telephone keypad, wherein determining eligibility is further based on receiving the verification code from the applicant.

27. A non-transitory computer readable medium comprising instructions that, when executed by a processor, perform a method for operating a secure facility call management system, the method comprising:

receiving a completed application for participation in a familial-based discount telephonic rate program;

determining eligibility for the familial-based telephonic discount rate program based on the completed application, wherein eligibility is further based upon an applicant having a family member who is a participant in the familial-based discount telephonic rate program and the applicant being specified as a contact in a secure social network account of the family member;

instrumenting, using a booking kiosk of the secure facility call management system, a mobile computing device of the family member with instrumented software to impose, using the secure facility call management system, a security restriction regarding a type of person that the family member is prohibited from contacting, wherein the family member resides at a controlled facility associated with the secure facility call management system, wherein the instrumented software of the mobile computing device verifies that communicating with the applicant does not violate the security restriction,
wherein the booking kiosk obtains verification data used to authenticate the family member;
obtaining a copy of a telephone bill of the applicant at the secure facility call management system;
communicating a verification code to the applicant;
placing a call, by the secure facility call management system and over a communications network, to a telephone number specified in the telephone bill; and
requiring the applicant to enter the verification code using a telephone keypad, wherein determining eligibility is further based on receiving the verification code from the applicant.

* * * * *

UNITED STATES PATENT AND TRADEMARK OFFICE
CERTIFICATE OF CORRECTION

| | | |
|---|---|---|
| PATENT NO. | : 10,002,399 B2 | Page 1 of 1 |
| APPLICATION NO. | : 13/957204 | |
| DATED | : June 19, 2018 | |
| INVENTOR(S) | : Richard Torgersrud et al. | |

It is certified that error appears in the above-identified patent and that said Letters Patent is hereby corrected as shown below:

On the Title Page

Item (72) Inventors:, the first Inventor listed reads "Richard Torgersud" should read -- Richard Torgersrud --.

In the Claims

Claim 9, Column 16, Line 23, the word -- wherein -- should be inserted following the number "8".

Signed and Sealed this
Twenty-fifth Day of June, 2019

Andrei Iancu
*Director of the United States Patent and Trademark Office*